United States Patent
Patel et al.

(10) Patent No.: US 10,920,969 B1
(45) Date of Patent: Feb. 16, 2021

(54) LIGHTED SIGN

(71) Applicant: 511 Technologies Inc., Marshall, TX (US)

(72) Inventors: Paresh Patel, Marshall, TX (US); Alan Loudermilk, Marshall, TX (US)

(73) Assignee: NEBULAE LLC, Marshall, TX (US)

(*) Notice: Subject to any disclaimer, the term of this patent is extended or adjusted under 35 U.S.C. 154(b) by 0 days.

(21) Appl. No.: 16/571,056

(22) Filed: Sep. 13, 2019

Related U.S. Application Data

(60) Provisional application No. 62/731,071, filed on Sep. 13, 2018.

(51) Int. Cl.
| | |
|---|---|
| *G09F 13/04* | (2006.01) |
| *F21V 19/04* | (2006.01) |
| *F21V 19/00* | (2006.01) |
| *F21S 9/03* | (2006.01) |
| *F21S 10/06* | (2006.01) |
| *F21W 111/02* | (2006.01) |
| *H02J 7/35* | (2006.01) |
| *F21Y 115/10* | (2016.01) |

(52) U.S. Cl.
CPC .............. *F21V 19/04* (2013.01); *F21S 9/037* (2013.01); *F21V 19/001* (2013.01); *G09F 13/04* (2013.01); *F21S 10/06* (2013.01); *F21W 2111/02* (2013.01); *F21Y 2115/10* (2016.08); *G09F 2013/049* (2013.01); *G09F 2013/0472* (2013.01); *H02J 7/35* (2013.01)

(58) Field of Classification Search
CPC .. G09F 13/00; G09F 13/04; G09F 2013/0418; F21V 9/001; F21V 19/001; F21V 19/04; F21S 9/037
See application file for complete search history.

(56) References Cited

U.S. PATENT DOCUMENTS

| | | | | |
|---|---|---|---|---|
| 5,099,592 | A | * | 3/1992 | Layne ...................... G09F 13/04 248/156 |
| 5,819,455 | A | | 10/1998 | Tsuda |
| 6,009,650 | A | | 1/2000 | Lamparter |
| 6,198,410 | B1 | | 3/2001 | White |
| 6,693,556 | B1 | | 2/2004 | Jones |
| 6,943,698 | B2 | | 9/2005 | Jones |
| 7,148,813 | B2 | | 12/2006 | Bauer |
| 2010/0307041 | A1 | * | 12/2010 | Tian ........................ G09F 13/22 40/575 |

(Continued)

OTHER PUBLICATIONS

Tapco Blinkersign Solar R2-1 brochure.

*Primary Examiner* — Karabi Guharay
(74) *Attorney, Agent, or Firm* — Loudermilk & Associates

(57) ABSTRACT

The present invention provides lighted signs and in particular electronic signs having embedded or integral light sources and in particular to lighted signs that have field replaceable lights and field replaceable face plates, and which preferably are controlled by an Internet-connected controller and which preferably includes an integral solar panel mount and an integral battery box mount, and still preferably include radios for pole-to-pole/machine-to-machine communication for synchronized control, and such products preferably having an additional network connection for Internet connectivity, such as by way of GPRS/GSM/cellular gateway functionality, WiFi, LAN, fiber optic or other network connectivity.

20 Claims, 9 Drawing Sheets

(56) References Cited

U.S. PATENT DOCUMENTS

| | | | | |
|---|---|---|---|---|
| 2011/0107633 | A1* | 5/2011 | Wells | G09F 13/20 40/572 |
| 2016/0005313 | A1 | 1/2016 | Cholayil | |

* cited by examiner

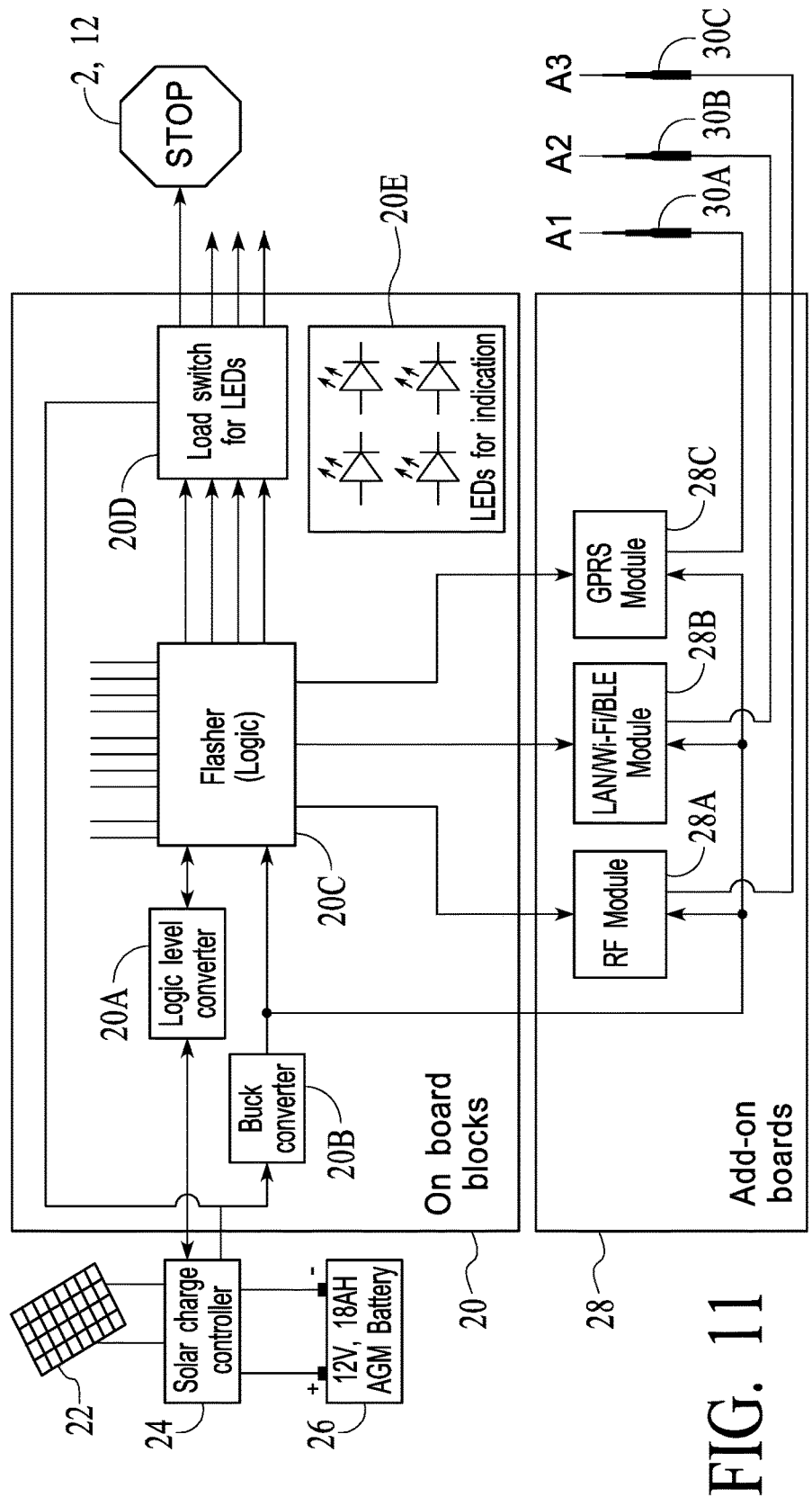
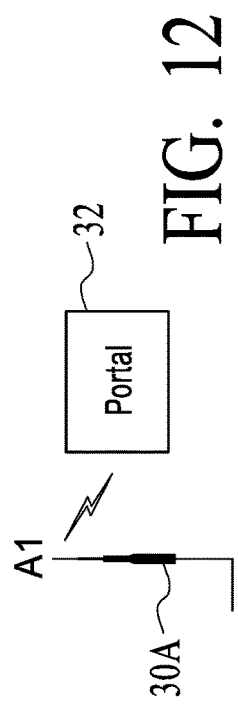
FIG. 11
FIG. 12

LIGHTED SIGN

This application claims priority on U.S. Provisional Application Ser. No. 62/731,071, filed Sep. 13, 2018, which is hereby incorporated by reference.

FIELD OF THE INVENTION

The present invention relates to lighted signs and in particular to electronic signs having embedded or integral light sources such as for flashing road warning signs and the like, and in particular to lighted signs that have field replaceable lights (e.g., LEDs) and field replaceable face plates (e.g., stop sign face), and which preferably is controlled by an Internet-connected controller and which preferably includes an integral solar panel mount and an integral battery box mount such that the sign assembly may be readily installed on a pole in the operative environment, and still preferably such products include radios for pole-to-pole/machine-to-machine communication for synchronized control, and such products preferably having an additional network connection for Internet connectivity, such as by way of GPRS/GSM/cellular gateway functionality, WiFi, LAN, fiber optic or other network connectivity, and preferably with a modular architecture so that a variety of communication interfaces may be coupled to a central logic/flasher logic board to meet the needs of the particular application.

BACKGROUND OF THE INVENTION

Electronic road signs and lighting products having various degrees of lighting, intelligence and connectivity exist or have been proposed. There are limitations of existing systems, and there is a growing need for more advanced signage and lighting products.

One such type of lighted road sign product includes LEDs of a minimum brightness mounted on a sign face. Such products typically have the back ends of LEDs and/or wiring protruding through the back side of the sign face such that wiring for a plurality of LEDs may be routed to a power source/control electronics, which may be by way of a tube or conduit that go around the periphery of the back side of the sign, which may be unsightly or provide areas for water intrusion or vandalism, and which typically means that a solar panel mount or control box must located in some other location. Typically, with such products, field replacement of sign faces and/or LEDs is difficult if not next to impossible. Also, installation of such products is more difficult because separate provision must be made for installation of a box or container for housing electronics and one or more batteries, and for mounting a solar panel (in the case of a DC powered, solar system) or a power supply for an AC powered system.

A need exists for improvements to such products.

SUMMARY OF THE INVENTION

The present invention provides improved lighted signs and electronic signs having embedded or integral light sources such as described above and below. As examples, in accordance with the present invention improved signs with LEDs embedded into a sign assembly are provided. In preferred embodiments of such signs, LEDs are mounted to a back substrate. The LEDs preferably included a plurality of LEDs in series, and more preferably include a plurality of series LEDs connected in parallel (e.g., two parallel strings of three LEDs that are connected in series). Such LEDs provide a desirable and controllable level of output intensity, with each LED being driven at less than maximum brightness so as to achieve longer life of the LEDs, with lower power consumption with the series connection, and parallel strings given a measure of redundancy in case of an LED failure removing one string from operation. With such a plurality of LEDs, PWM control preferably is provided to each LED so that all LEDs are PWM-brightness controlled at all times, enabling desirable control of both daytime and nighttime brightness.

Preferably, the LEDs mounted to the back substrate are in part secured with a cylindrical sleeve (or a sleeve with a pair of preferably parallel sides having a cylindrical inner surface) also mounted to the back substrate, wherein the sleeve has an open face or aperture from which light from the LEDs may emanate. The sleeves preferably are rigidly secured to the back substrate and are adapted to fit with a grommet-type cylindrical fitting that secures a front, sign indicia plate to the back substrate on which the LEDs are mounted. The grommets preferably have an indentation feature so that a screw or other appendage from protrude from the sleeve into the indentation feature, providing a secure locking mechanism for the front indicia plate to the back substrate. The grommets also preferably are adapted to have a lip or extension that extends beyond holes in the indicia plate so that a secure fit is obtained for the assembly (grommet-sleeve and front plate-back substrate), and an aesthetically pleasing light aperture is provided for the light from the LEDs. Such improved signs may be adapted for stop signs, pedestrian crossings, school crossings, construction signs, high water signs, and many other types of road and other signage products.

Description elsewhere herein describe and/or illustrate many aspects of preferred and alternative embodiments of such improved signage products.

Also in accordance with the present invention, controlling electronics are provided for such signage products, which also is adaptable and usable for a wide variety of lighting and other products. In accordance with such embodiments, a central logic or flasher board is provided (flasher, being somewhat of a nickname as many road signs utilize flashing lights to draw the attention of drivers or pedestrians to improve safety and the like), and preferably a variety of radio and other communication modules are provided. Such modular connectivity can allow, for example, 2.4 GHz radios that can enable pole-to-pole (or machine-to-machine) connectivity, while one system also can include Internet connectivity which may be by way of a GPRS/GSM/cellular module (or other network connectivity function, as disclosed elsewhere herein). Such a system preferably provides a gateway to the Internet/cloud, and via 2.4 GHz (or other radio band) radios the various devices that are "bound" via the radios may be controlled via an Internet/cloud connection, and also may be monitored via an Internet/cloud connection. Preferably, a portal is provided so that a variety and large number of such devices can be controlled via a common portal, such as a city worker monitoring and controlling a variety of signage and lighting products via the common portal. Preferably the worker may view logs of activities (such as pedestrian crosswalk trigger and light on/light off events), and also view status information regarding batteries, solar panels, LED/light status, etc., and also can set schedules such as for school crossing zones and the like. The portal may conveniently access and control a large number of devices (end nodes), provided that each has access to a gateway providing access to the cloud server, which hosts control and status information for each device. Also, preferably a graphical user interface is provided by the portal so that devices can be viewed on a map (such as signs shown on a map corresponding to their actual physical location in a city), and also a graphical tree or similar representation for binding nodes and a gateway such as in a crosswalk application (so that one button push on one pole triggers lights on a plurality of poles that are "bound" together. Via the cloud, users may receive alerts and alarms based on the status of devices in the network.

Accordingly, it is an object of the present invention to provide improved lighted sign products having LEDs or other light source mounted to a back substrate, preferably with a front indicia face secured to the back substrate with a grommet and sleeve arrangement. It is another object of the present invention to provide.

It is yet another object of the present invention to provide improved lighted sign products having a replaceable front indicia surface that may be readily removed from the back substrate, preferably by grommet removal, and preferably with grommets having secure retention features but which may be readily removed for front face replacement.

It further is an object of the present invention to facilitate replacement of LEDs or other light sources in such products, preferably secured to a back substrate by way of a sleeve mounted to the back substrate.

It is yet further an object of the present invention to provide such products having a back substrate that may provide a rigid back structure such that a solar panel mount may be secured to the back substrate such as with bolts and/or such that a battery or electronic control box may be secured to the back substrate, such that an entire solar powered lighted sign assembly may be readily installed and mounted to a pole.

Finally, it is an object of the present invention to provide such products with electronic control so that such products may be intelligently controlled preferably via an Internet connection and Internet or "cloud" portal.

BRIEF DESCRIPTION OF THE DRAWINGS

The above objects and other advantages of the present invention will become more apparent by describing in detail the preferred embodiments of the present invention with reference to the attached drawings in which:

FIG. 11 is an illustration of exemplary control electronics in accordance with preferred embodiments of the present invention; and FIG. 12 is an illustration of Internet connectivity to a remote, preferably cloud-based portal in accordance with preferred embodiments of the present invention.

DETAILED DESCRIPTION OF THE PREFERRED EMBODIMENTS

The present invention will be described in greater detail with reference to certain preferred and alternative embodiments. As described below, refinements and substitutions of the various embodiments are possible based on the principles and teachings herein.

In accordance with the present invention, lighted signs and in particular electronic signs having embedded or integral light sources are provided such as for flashing road warning signs and the like, and in particular lighted signs that have field replaceable lights (e.g., LEDs) and field replaceable face plates (e.g., stop sign face). In accordance with preferred embodiments, such LEDs/lights are preferably controlled by an Internet-connected controller. In accordance with certain preferred embodiments, the back substrate is sufficiently strong and rigid so as to provide an integral solar panel mount area and an integral battery box mount area such that the sign assembly may be readily installed on a pole in the operative environment. Also in accordance with preferred embodiments, in the case of multi-pole systems (such as crosswalks with poles on opposite sides of a street and possibly in a median, and such as school zones having multiple poles for multiple directions of entry into the school zone), such products preferably include radios for pole-to-pole/machine-to-machine communication for synchronized control, and such products preferably also include a network connection for Internet connectivity, such as by way of GPRS/GSM/cellular gateway functionality, WiFi, LAN, fiber optic or other network connectivity. Preferred embodiments preferably have a modular architecture so that a variety of communication interfaces may be coupled to a central logic/flasher logic board to meet the needs of the particular application.

Figure 1:
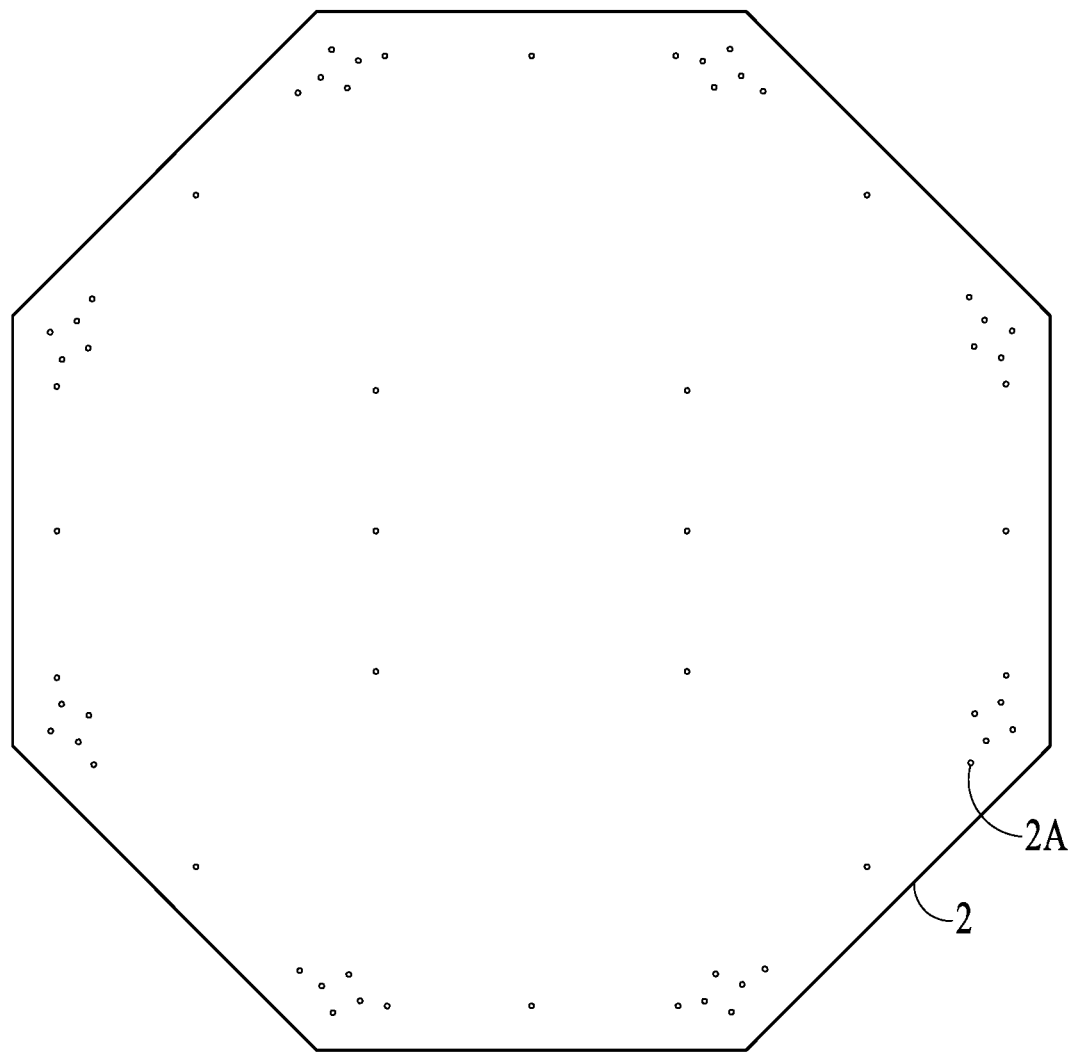
FIG. 1 is an illustration of an exemplary back substrate in accordance with preferred embodiments of the present invention.

FIG. 1 illustrates an exemplary back substrate in accordance with preferred embodiments of the present invention. As illustrated, back substrate 2 is a preferably flat rigid structure on which other implements of preferred embodiments are secured, Back substrate 2 includes a plurality of mounting holes 2A such as for L brackets/clamps 4 and sleeves 8 hereinafter described. Also, as later described, back substrate 2 preferably is sufficiently strong so that a battery/control box may be mounted to back substrate 2 such as by way of bolts and nuts, and also preferably is sufficiently strong so that a solar panel mount tube (preferably square, round or rectangle) may be mounted to back substrate 2 such as by way of bolts and nuts. It is an objective of the present invention to provide an assembly with back substrate 2 such that the battery/control box may be readily mounted thereto, while back substrate 2 also provides a surface for mounting LEDs/light sources 10 and sign face 12 such that both may be replaced, such as in the field.

Figure 2:
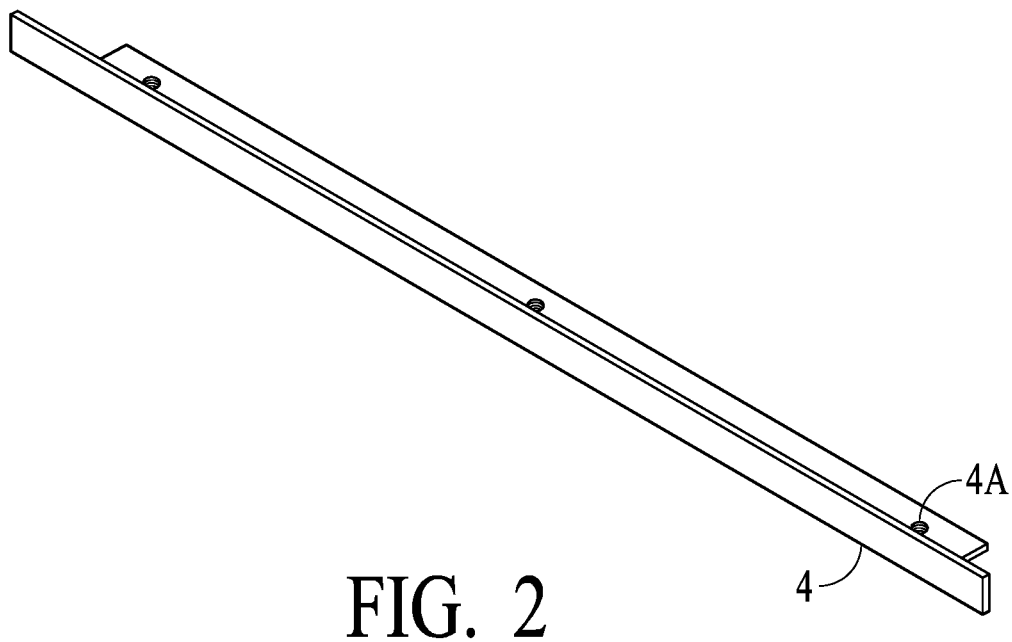
FIG. 2 is an illustration of an exemplary bracket or clamp (preferably L shaped) in accordance with preferred embodiments of the present invention.

FIG. 2 illustrates an exemplary bracket or clamp 4 (preferably L shaped) in accordance with preferred embodiments of the present invention. As illustrated, brackets/clamps 4 include preferably threaded screw holes 4A by which brackets/clamps 4 are secured to back substrate 2. Brackets/clamps 4 provide rigidity to the assembly and also help define the distance between back substrate 2 and sign face 12 (hereinafter described). In accordance with preferred embodiments of the present invention, the gap or spacing between back substrate 2 and sign face 12 provide an area to route wiring for powering the LEDs/light sources in a relatively secure cavity, not exposed to all elements and the like, providing yet additional advantages over certain conventional systems in which wires are routed exterior to a sign face, etc.

Figure 3:
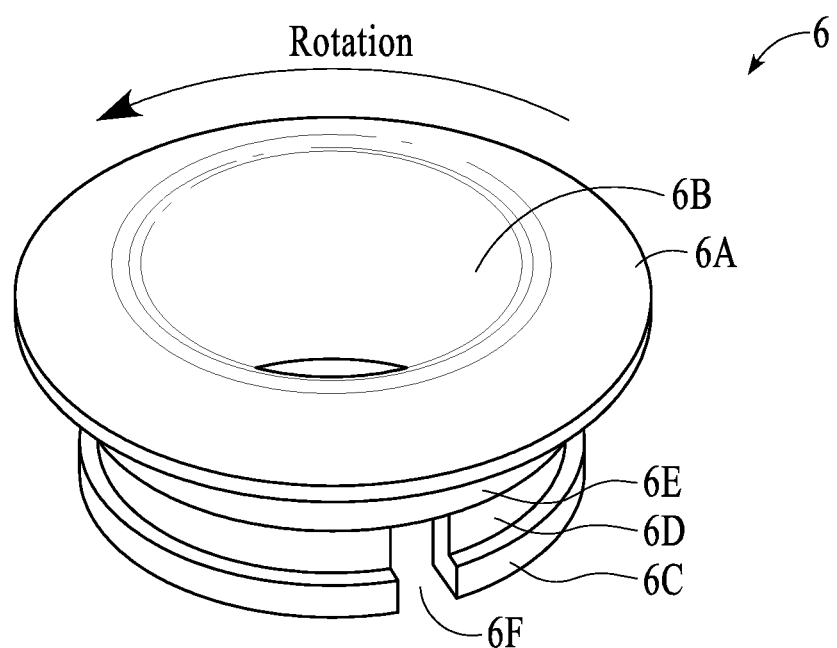
FIG. 3 is an illustration of a grommet or grommet-type structure in accordance with preferred embodiments of the present invention.

FIG. 3 illustrates grommet 6 (or grommet-type structure) in accordance with preferred embodiments of the present invention. As illustrated, grommet 6 preferably has interior opening 6B through which LEDs/light sources 10 are visible. Opening 6B preferably has a reflecting or non-light-absorbing surface so that light rays may efficiently emanate from opening 6B to be visible by persons or vehicles approaching the sign assembly. Grommet 6 also preferably has an extending flange type region 6A that is wider than the hole in sign face 12 in which grommet 6 is placed, so as to provide an esthetically pleasing look and also providing manufacturing tolerance for production of such holes in sign face 12. Lips or extensions 6C and 6E preferably have a wider diameter than channel region 6D such that an indentation or channel is provided such that a protrusion (e.g., a screw, illustrated as 8E in FIG. 4) may extend into an interior portion of sleeve 8 (described hereinafter) and enter to channel region 6D and preferably engage channel region 6D to mechanically engage and lock grommet 6 and sleeve 8, thereby securing the assembly including back substrate 2 and sign face 12 together, along with LEDs/light sources 10, also secured to back substrate 2 by way of sleeves 8. Protrusion 8E (e.g., screw) through sleeve 8 into channel region 6D is facilitating by opening 6F, and in preferred embodiments grommet 6 initially engages sleeve 8 such that protrusion 8E is in opening 6F, and then grommet 6 is rotated such that protrusion 8E is an area of channel region 6D remote from opening 6F, thereby facilitating the lock of grommet 6 and sleeve 8 together. In preferred embodiments, protrusion 8E is a screw which may then be further extended to rigidly engage grommet 6 in channel region 6D to add further securing strength of the assembly.

Figure 4:
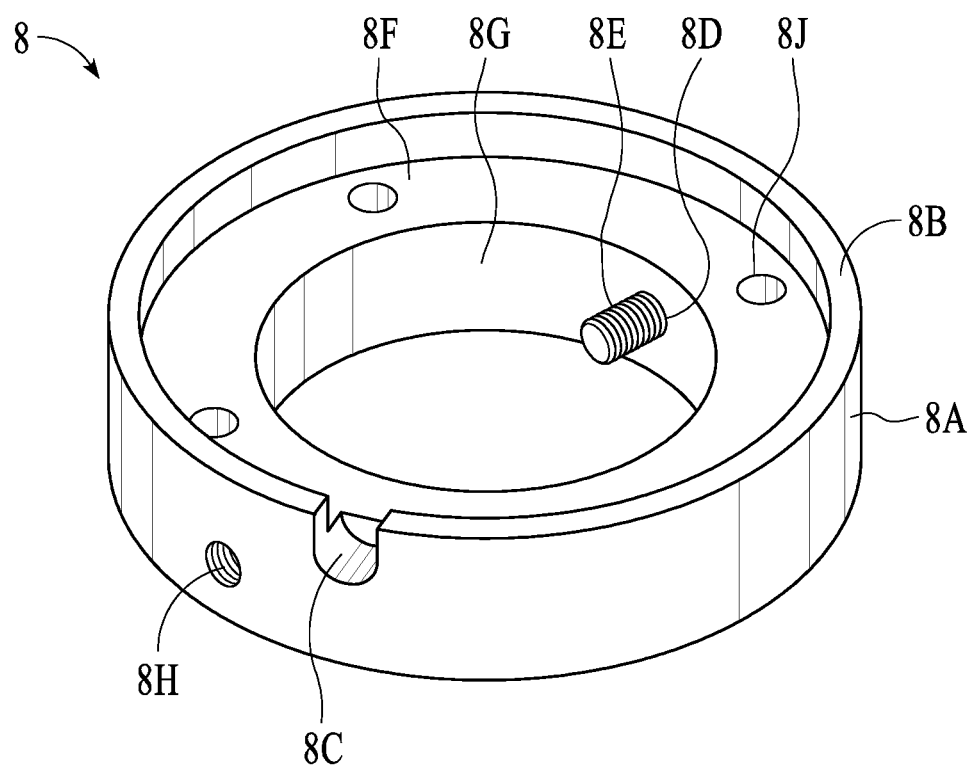
FIG. 4 is an illustration of a sleeve or sleeve-type structure in accordance with preferred embodiments of the present invention.

FIG. 4 illustrates sleeve 8 (or sleeve-type structure) in accordance with preferred embodiments of the present invention. As illustrated, sleeve 8 preferably includes threaded screw holes 8J, by which sleeve 8 is secured to back substrate 2. Also as illustrated, sleeve 8 includes main body 8A with raised wall 8B, such that wall 8B surrounds LED engaging surface 8F and provides a cavity in which LEDs/lights sources 10 may be positioned and secured to back substrate 2. As will appreciated from the description herein, LEDs/light sources 10 preferably include structure (e.g., a PCB) having notches to engage screws that are screwed into holes 8J, thereby helping to secure LEDs/lights sources 10 to back substrate 2. As described elsewhere herein, sleeve 8 preferably includes threaded hole 8D by which protrusion 8E may protrude into the opening defined by cylindrical wall 8G. Protrusion 8E desirably engages with channel region 6D of grommet 6 to facilitate securing together grommet 6 and sleeve 8. In accordance with preferred embodiments, notch 8C is provided as an arch (not closed) structure so that wires from LEDs/light sources 10 may extend to the exterior of sleeve 8, preferably into the cavity defined between back substrate 2 and front face 12, to facilitate wire routing to the battery/control box, as will be understood. Also in accordance with preferred embodiments, threaded hole 8H is provided for an additional screw to extend from sleeve 8 into the interior defined by wall 8G so as to engage grommet 6 and further lock grommet 6 and sleeve 8 together.

Figure 4A:
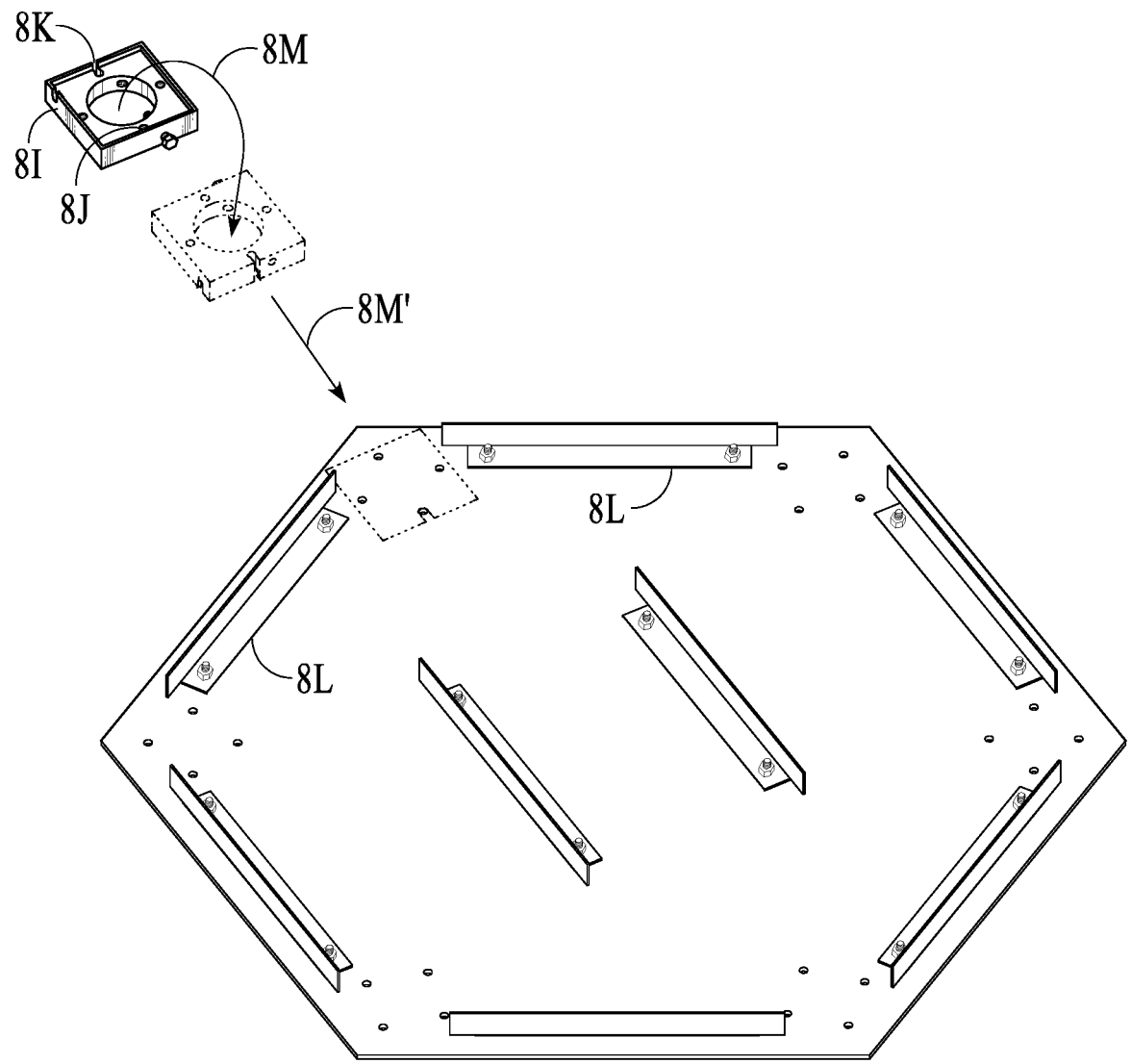
FIG. 4A is an illustration of a sleeve or sleeve-type structure having straight sides in accordance with alternative preferred embodiments of the present invention.

FIG. 4A illustrates an alternative preferred embodiment sleeve 8I (or sleeve-type structure) having preferably straight sides so as to be able to slide out from between L brackets/clamps 8L (8L in this illustration, but more generally denoted herein by the number 4). The sides of sleeve 8I facing L brackets/clamps 8L is either straight or otherwise having a shape such that in an assembled sign sleeve 8I may slide outward in the direction of arrow 8M (after removal of the mounting screws), thereby facilitating field replacement of LED/light source 10 that is secured by sleeve 8I. In other preferred embodiments, L brackets/clamps 4 may need to be moved to remove sleeve 8, but in accordance with such alternative preferred embodiments of the present invention, LEDs/light sources 10 may be replaced by removing screws in screw holes 8J, sliding sleeve 8I outward along with its LED/light source 10, which may be replaced in the event of failure (such as by clipping wires of the defective LED/light source 10, and by crimping in a replacement LED/light source 10 and securing it by sleeve 8I and screws via screw holes 8J. Sleeve 8I preferably includes notch or location feature 8K preferably in the inward facing back wall of sleeve 8I as illustrated, such that notch or location feature 8K engages a raised portion of back substrate 2 to help align sleeve 8I such that screw holes 8J of sleeve 8I with corresponding screw holes of back substrate 2. It is an object of the present invention to facilitate replacement of defective LEDs/light sources 10 in the operative environment (which may be elevated and mounted on a pole), and it has been discovered that in such environments sleeves such as 8I may be more readily removed and re-secured to back substrate 2 by way of notch or location feature 8K, which may engage a screw or other protrusion of back substrate 2.

Figure 5:
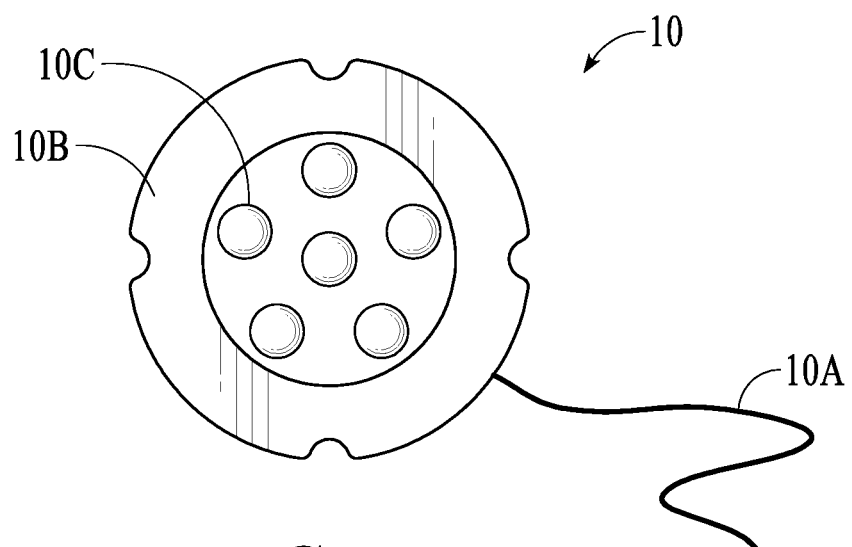
FIG. 5 is an illustration of an LED assembly in accordance with certain preferred embodiments of the present invention.

FIG. 5 illustrates LED/light source 10, which preferably is an assembly of at least 4 or more LEDs, having multiple LEDs (in the illustrated preferred embodiment 3 LEDs in series) in each of at least two parallel strings (in the illustrated preferred embodiment 2 parallel strings). As illustrated, the preferred embodiment includes a number N of parallel strings of LEDs, with each string consisting of a number M of LEDs connected in series, with N and M each greater than 2. In the illustrated embodiment, N is 2 and M is 3, for a total of six LEDs. What is important is that parallel strings (two or more) provide a measure of redundancy in case one of the series-connected LEDs in a string fails, but another string may continue to operate. LEDs in series provide greater intensity for a given current flow, thereby improving light efficiency in accordance with such preferred embodiments of the present invention. As illustrated, LEDs/light sources 10 include wiring 10A for providing electrical current to the LED/light source 10 assembly, and a plurality of individual LEDs 10C as illustrated. Also preferably, LEDs/light sources 10 include notched PCB/substrate 10B, which include a notch or similar feature to engage, preferably, screws into sleeves 8 to facilitate securing of LEDs/light sources 10 to back substrate 2, such as additionally described elsewhere herein.

Figure 6:
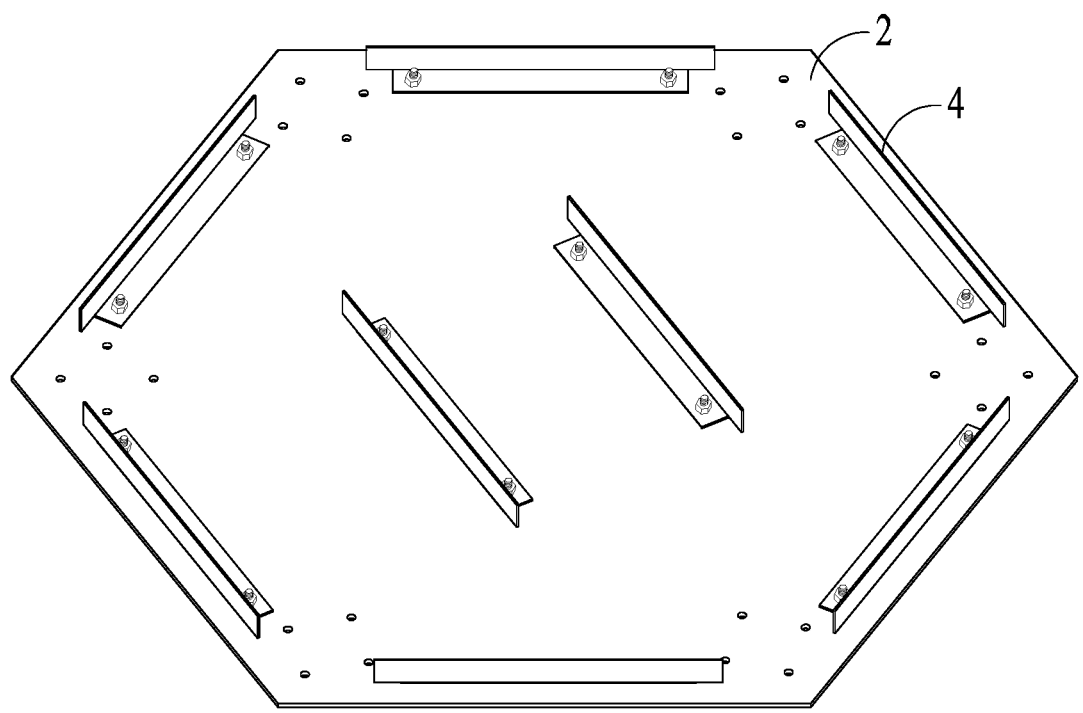
FIG. 6 is an illustration of a back substrate having exemplary brackets/clamp mounted thereon in accordance with preferred embodiments of the present invention.

FIG. 6 illustrates back substrate 2 having exemplary L brackets/clamps 4 mounted thereon in accordance with preferred embodiments of the present invention. In alternative embodiments, brackets/clamps 4 are shaped other than L (such as solid squares or open tubes). What is important is that brackets/clamps 4 are securable to back substrate 2 (by screws or weld, etc.) to provide rigidity and structural integrity and define the cavity/space between back substrate 2 and front face 12, such as described elsewhere herein.

Figure 7:
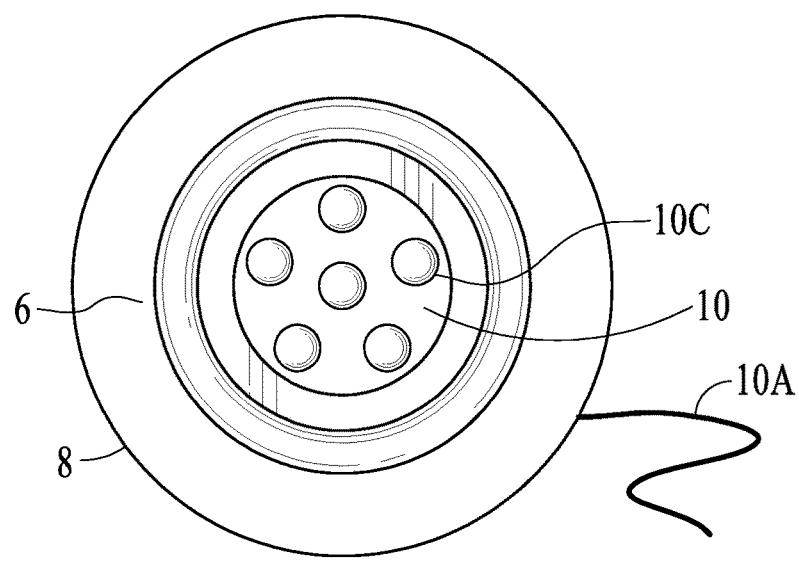
FIG. 7 is an illustration (front view) of a grommet, sleeve and LED subassembly in accordance with preferred embodiments of the present invention.
Figure 8:
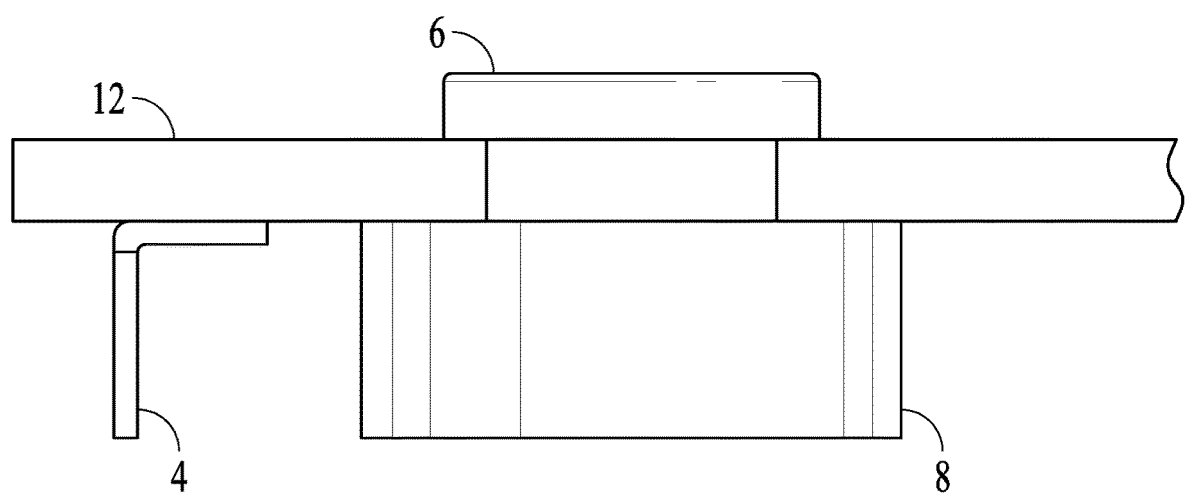
FIG. 8 is an illustration (side view) of a grommet, sleeve and LED subassembly in accordance with preferred embodiments of the present invention.

FIG. 7 illustrates (front view) of an exemplary grommet 6, sleeve 8 and LED/light source 10 (having a plurality of LEDs 10C and wiring 10A), in accordance with certain preferred embodiments of the present invention. FIG. 8 illustrates (side view) grommet 6, sleeve 8, L clamp/bracket 4 and their positions relative to front face 12. Front face 12 is illustrated as a typically aluminum stop sign, red front face, but it should be understand that the present invention may be used with other types of sign faces, etc.

Figure 9:
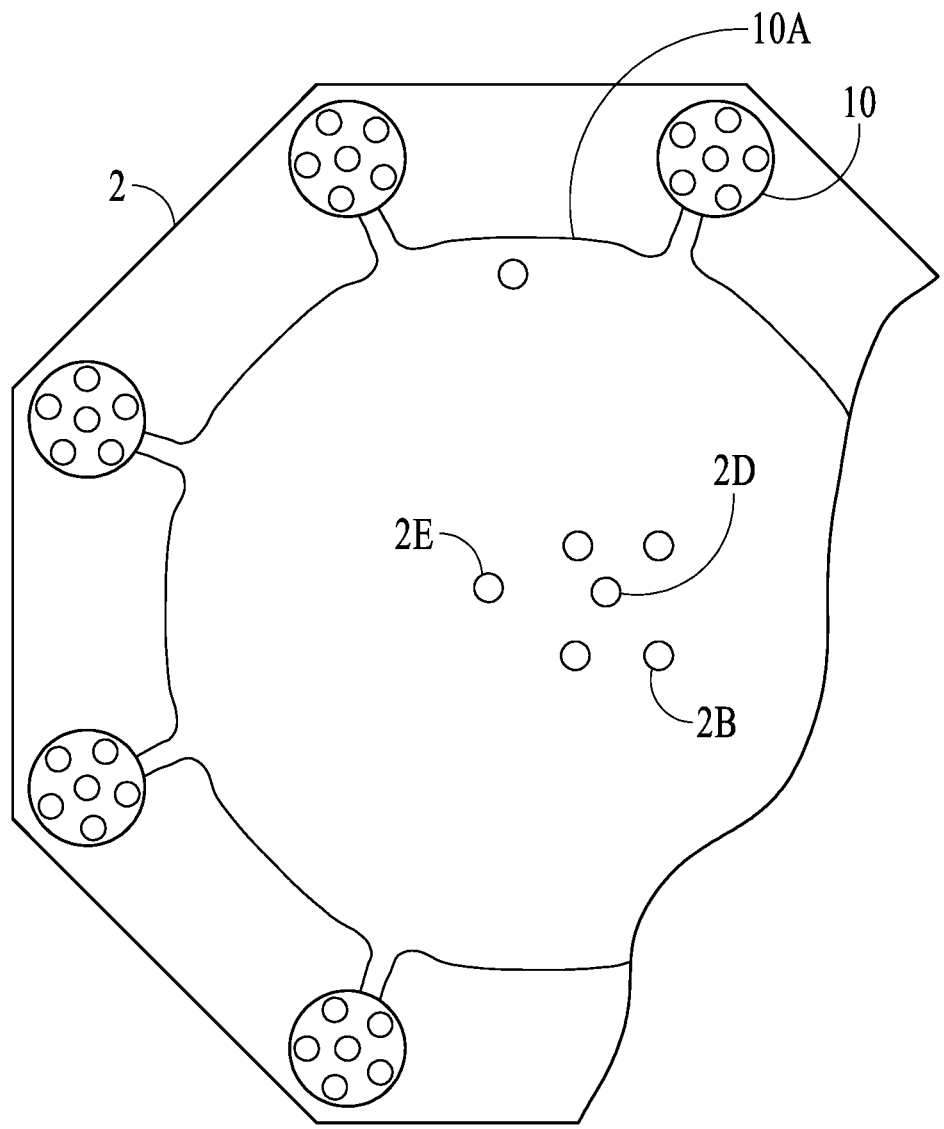
FIG. 9 is an illustration of a front surface of a back substrate in accordance with preferred embodiments of the present invention.
Figure 10:
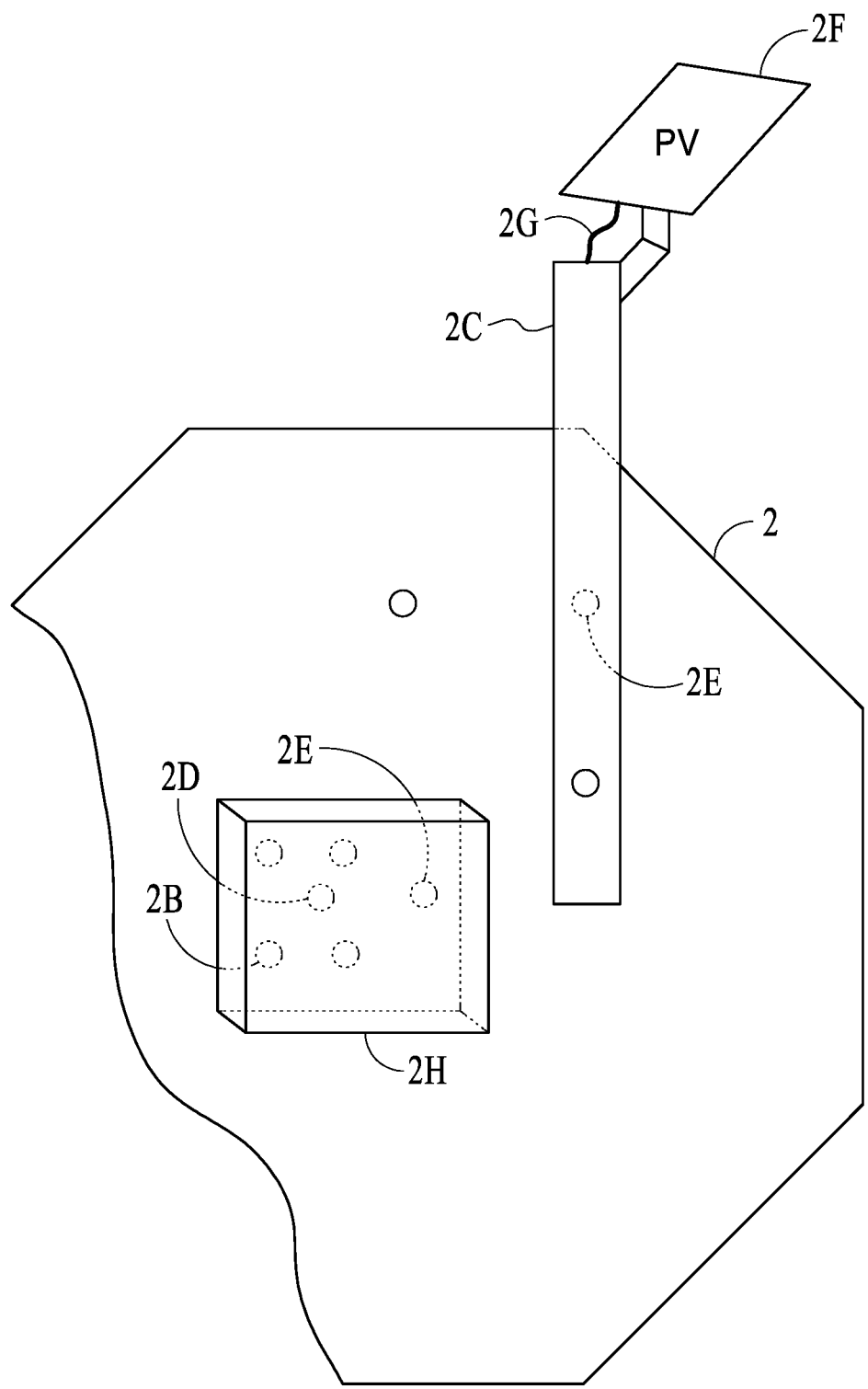
FIG. 10 is an illustration of a back surface of a back substrate in accordance with preferred embodiments of the present invention.

FIG. 9 illustrates a front surface of back substrate 2 and FIG. illustrates a back surface of back substrate 2, showing LEDs/light sources 10 and wiring 10A (the wiring loop being illustrative) being conveniently routed around this front surface in the gap/cavity defined by the space between back substrate 2 and front face 12. Also as illustrated, back substrate 2 may include holes 2B, which may include for example 4 holes 2B for mounting a battery/control box 2H to back substrate 2, preferably 2 holes 2E for mounting solar panel mount tube 2C, hole 2D to enable LED wiring 10A to enter battery box 2H (FIG. 10), hole 2E to enable wiring 2G from solar panel 2F to go down mount tube 2C, and enter the interior gap/cavity and be routed into battery/control box 2H. What is important is that back substrate 2 is sufficiently strong to provide mounting for battery/control box 2H and solar mount tube 2C, with the interior gap/cavity between back substrate 2 and front face 12 facilitating routing of wires into battery/control box 2H. With such an integral structure, sign assembly mounting is greatly facilitated, while providing a rugged assembly with internal wiring and easily (field) replaceable LEDs and front faces, etc., providing significant advantages over conventional lighted signs, etc.

FIG. 11 illustrates exemplary control electronics in accordance with preferred embodiments of the present invention. As illustrated, board 20 includes flasher (logic board) 20C coupled to an output device (load switch 20D) to drive/control LEDs/light sources 10 could to the sign (illustrated by 2, 12 in FIG. 11). LEDs 20E are illustrated. It should be understood that in certain embodiments load switch 20D switches positive potential to LEDs/light sources 10, and in other embodiments sinks current from ground legs of LEDs/lights sources 10 (i.e., turning on the LEDs by controllably completing the ground path to LEDs having a constant positive potential on the positive terminal, etc.). What is important is that board 20 controllably turns on/off LEDs/light sources 10 in the desired manner.

Also as illustrated, solar panel 22 is provided in preferred DC/solar embodiments, providing solar-induced voltage/current to solar charge controller 24, which is coupled to (and charges and controls power to/from battery 26. Buck/voltage 10B preferably converts power from the voltage level of battery 26 (e.g., 12 volts) to the suitable voltage level for board 20 (e.g., 3.3 volts). Preferably logic level converter exchanges or receives digital status and/or control information from solar charge controller 24 and couples resulting data to/from flasher/logic 20C. Also as illustrated, in preferred embodiments, a modular communications interface 28 is provided, that desirably provides RF communications via module 28A, which may be 2.4 GHz RF, 900 MHz RF, etc. Such RF preferably is used to provide pole-pole communications for synchronized communications, exchange of status and/or control information, etc. Also preferably, module 28B provides LAN, WiFi and/or Bluetooth wireless connectivity to board 20. In preferred embodiments, module 28C provides cellular/GPRS Internet connectivity to board 20. Antennas 30A, 30B and 30C illustrate radio communications for the connected modules so that various wireless communications capabilities are provided via board 20.

FIG. 12 illustrates Internet connectivity to a remote, preferably cloud-based portal in accordance with preferred embodiments of the present invention. As will be understood and appreciated by those of skill in the art, Internet connectivity to board 20 enables user ability to remotely monitor and control board 20 (and LEDs, battery, solar charge controller, etc.) via Internet/cloud portal 32. In accordance with preferred embodiments, a remotely monitorable and controllable electronic sign/lighting platform is provided, providing significant advantages over conventional systems.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. An electronic light emitting sign, comprising:
   a plurality of light sources arranged and physically secured to a back substrate, wherein each of the plurality of light sources are secured to the back substrate by a sleeve secured to the back substrate;
   a front sign face having an indicia surface, wherein the front sign face is secured to the back substrate by a grommet having a cylindrical structure with an indentation around a body, portion of the grommet, wherein a protrusion through the sleeve engages the grommet and physically secures the front sign face and the back substrate;
   wherein light is emitted from the fight sources and is visible emanating from a center portion of the grommets.

2. The sign of claim 1, wherein each of the light sources comprises a plurality of LEDs.

3. The sign of claim 2, wherein each of the light sources comprises N×M LEDs, wherein N is an integer number of parallelly-connected strings of LEDs, wherein M is an integer number of series-connected LEDs in each of the parallelly-connected string of LEDs.

4. The sign of claim 3, Wherein N and M are at least 2.

5. The sign of claim 1, wherein an interior cavity is defined between the back substrate and the front sign face, Wherein support members are secured to the back substrate in a peripheral portion of the back substrate, wherein the support members and the sleeves define the interior cavity.

6. The sign of claim 5, wherein wiring to connect the LEDs to control electronics is positioned in the interior cavity.

7. The sign of claim 6, wherein the back substrate has a hole through which the wiring connected to the LEDs is routable to the control electronics.

8. The sign of claim 7, Wherein a box housing the control onics is mounted to the back substrate.

9. The sign of claim 8, wherein the power source comprises a battery, wherein a solar panel is mounted to the back substrate and is connected to the battery via a solar charge controller and the control electronics.

10. The sign of claim 9, wherein the control electronics comprises flashing logic to control flashing of the LEDs and a radio module coupled to an antenna, wherein a connection is provided to the Internet via the radio module.

11. The sign of claim 10, wherein status information for the sign is obtained by a remote user via an Internet portal.

12. The sign of claim 5, where each sleeve has straight sides and is positioned between two support members, wherein a sleeve is removably secured to the back substrate and may be removed by movement outside of the cavity between the two support members, wherein an LED in a removed sleeve is replaceable.

13. An electronic light emitting sign, comprising:
a front sign face having an indicia surface;
a back substrate spaced apart from the front sign face, wherein an interior cavity is defined between the back substrate and the front sign face, wherein the interior cavity is defined by structure that separates the back substrate and the front sign face;
a plurality of light sources arranged and secured relative to the back substrate, wherein each of the plurality of light sources emit light via a corresponding hole in the front sign face via a grommet that surrounds the hole, wherein each of the grommets has a flange that is wider than the hole in the front sign face, wherein each of the light sources is recessed away from the indicia surface of the front sign face;
wiring coupled to each of the light sources, Wherein the wiring is positioned in the interior cavity and protrudes from a hole in the back substrate for connection to a control box; and
control electronics in the control box for controlling a flash pattern of the light sources;
wherein the front sign face is removable from the back substrate without removal of the light sources from the sign.

14. The sign of claim 13, wherein each of the light sources comprises a plurality of LEDs.

15. The sign of claim 14, wherein each of the light sources comprises N×M LEDs, wherein N is a number of parallelly-connected strings of LEDs, wherein NI is a number of series-connected LEDs in each of the parallelly-connected string of LEDs.

16. The sign of claim 15, wherein N and M are at least 2.

17. The sign of claim 13, wherein the interior cavity is defined between the back substrate and the front sign face by support members and sleeves that are secured to the back substrate in at least a peripheral portion of the back substrate, wherein the sleeves mounted to the back substrate surround each of the light sources.

18. The sign of claim 17, where each sleeve has straight sides and is positioned between two support members, wherein a sleeve is removably secured to the back substrate and may be removed by movement outside of the cavity between the two support members, wherein an LED in a removed sleeve is replaceable.

19. The sign of claim 13, wherein the control box is mounted to the back substrate.

20. The sign of claim 13, wherein the lights sources are coupled to control electronics comprising flashing logic to control flashing of the light sources and a radio module coupled to an antenna, wherein a connection is provided to the Internet via the radio module, Wherein status information for the sign is obtained by a remote user via an Internet portal.

* * * * *